Figure 3:
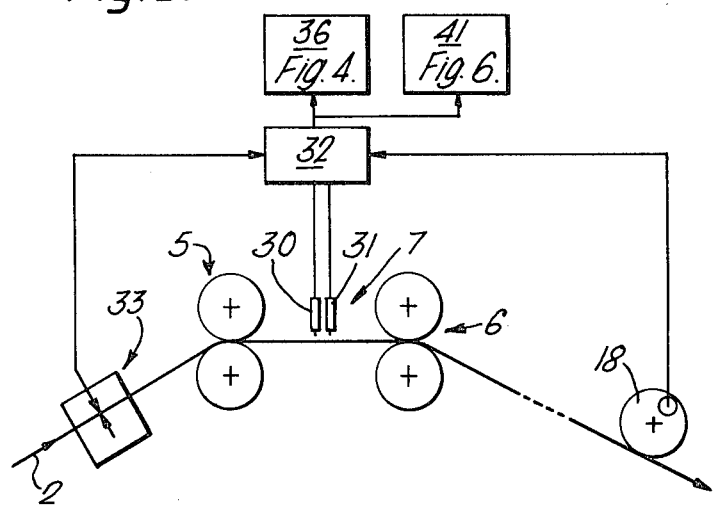

United States Patent [19]

Bergersen

[11] 4,354,886

[45] Oct. 19, 1982

[54] METHOD FOR MAKING ELECTRICAL HEATING MATS FROM AN EXPANDED FOIL-INSULATION COMPOSITE

[75] Inventor: Hans A. Bergersen, Oslo, Norway

[73] Assignee: International Standard Electric Corporation, New York, N.Y.

[21] Appl. No.: 242,492

[22] Filed: Mar. 10, 1981

[51] Int. Cl.³ .................. H01B 7/02; H01B 13/00; H01C 17/28
[52] U.S. Cl. ........................ 156/50; 29/611; 29/613; 29/619; 156/52; 156/199; 156/229; 156/257; 156/269; 156/353; 156/495; 156/324; 156/301
[58] Field of Search .................. 156/50, 52, 324, 301, 156/199, 257, 269, 353, 229, 378, 495; 29/61, 611, 613, 619; 219/542; 72/186; 83/881

[56] References Cited

U.S. PATENT DOCUMENTS

| | | | |
|---|---|---|---|
| 2,320,092 | 5/1943 | Miller | 156/495 |
| 3,149,406 | 9/1964 | Eisler | 29/611 |
| 3,255,065 | 6/1966 | Wyckoff | 156/229 |
| 3,427,712 | 2/1969 | Witdoeckt | 29/611 |
| 3,668,956 | 6/1972 | Whipple et al. | 83/881 |
| 4,025,893 | 5/1977 | Bergerson | 29/611 |
| 4,089,090 | 5/1978 | Westberg | 72/186 |

FOREIGN PATENT DOCUMENTS 1308708 3/1973 United Kingdom ................ 29/611

Primary Examiner—Jerome W. Massie
Attorney, Agent, or Firm—John T. O'Halloran; Robert E. Lee, Jr.

[57] ABSTRACT

This invention relates to a continuous method for making electrical heating mats suitable for installation on room floors, walls and ceilings, which method includes the steps of cutting transverse cuts in a longitudinal composite metal/plastic foil material (2) and stretching the foil in a controlled way in order to provide a meander pattern of electrical resistance strip material, the method also including steps of making unit length mats with predetermined ohmic resistance and steps of providing terminations.

6 Claims, 16 Drawing Figures

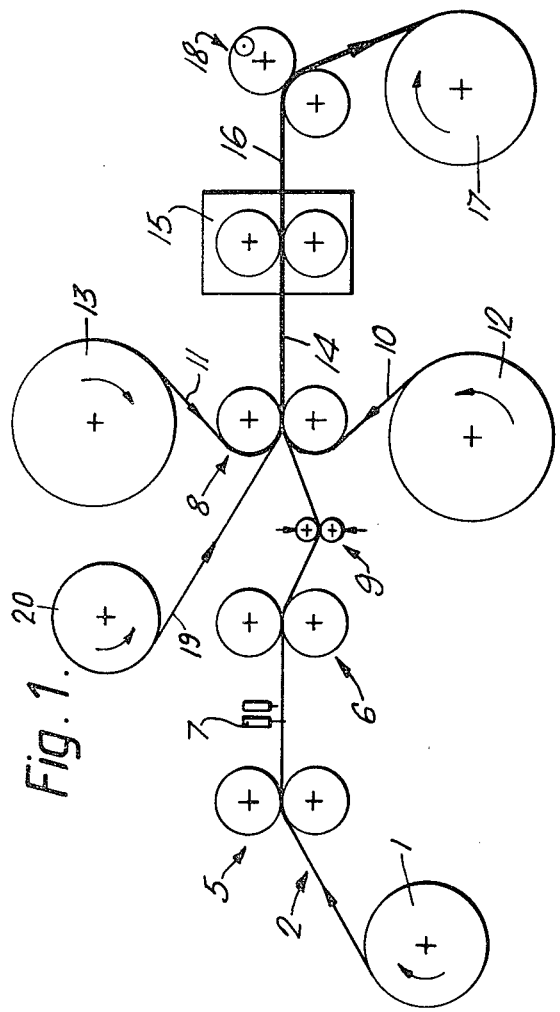
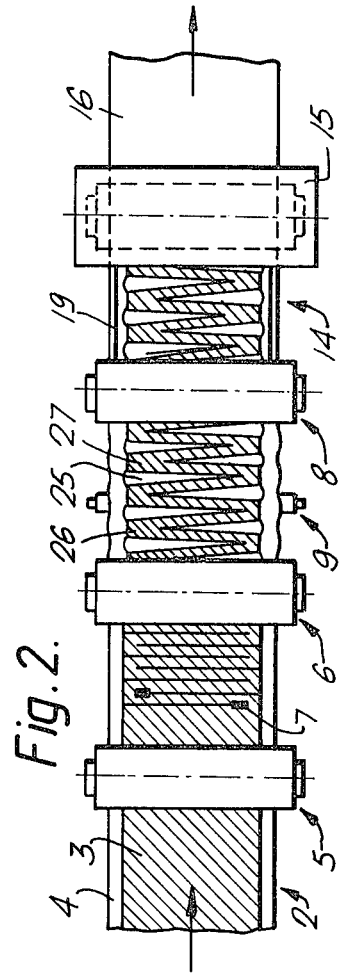
Fig. 1.
Fig. 2.

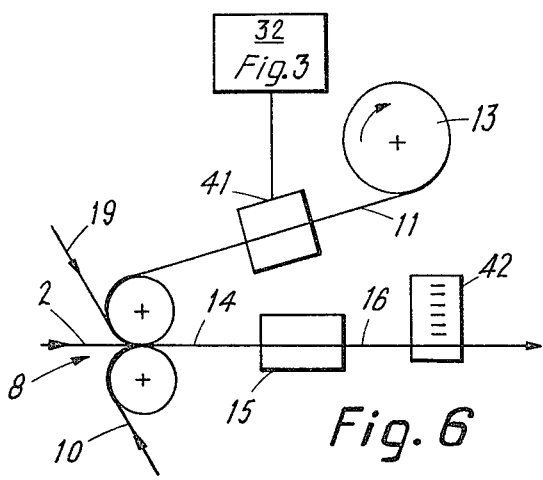
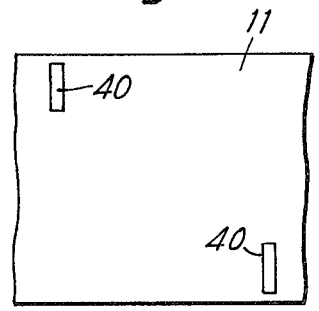
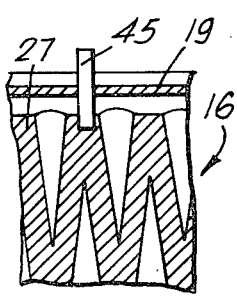
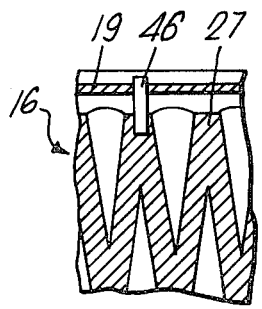
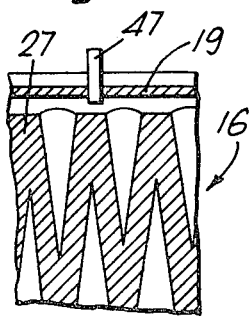
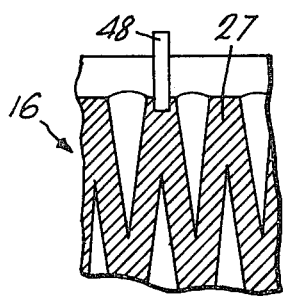

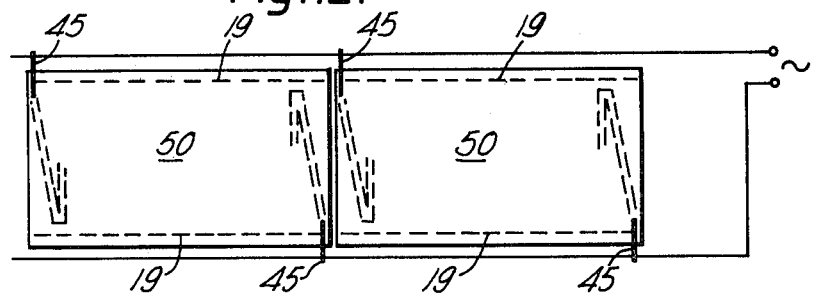
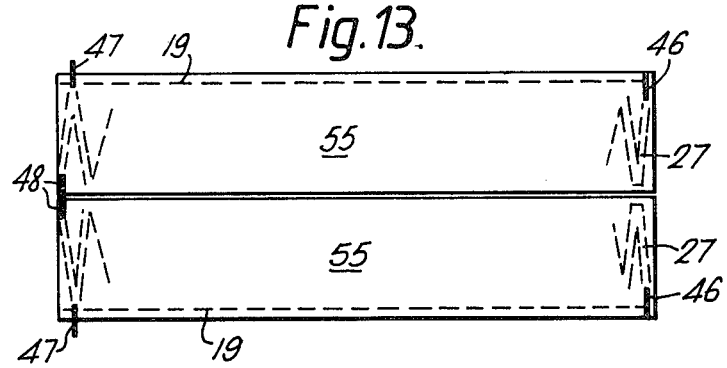
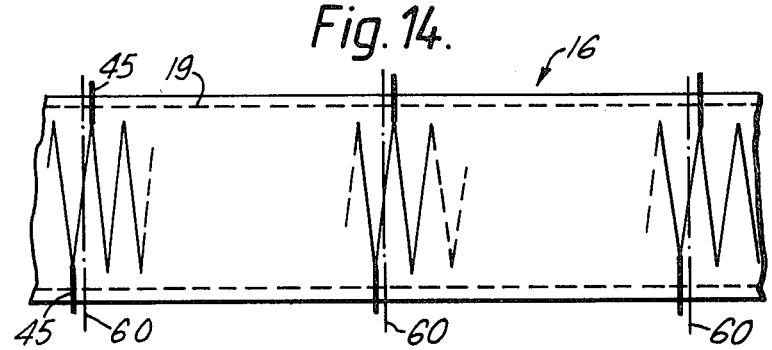
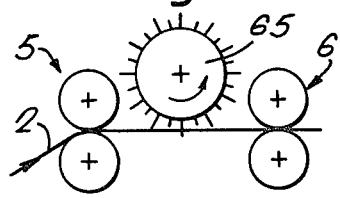
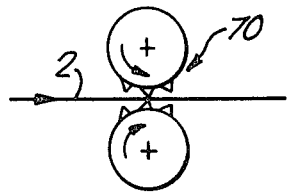

METHOD FOR MAKING ELECTRICAL HEATING MATS FROM AN EXPANDED FOIL-INSULATION COMPOSITE

The present invention relates to a method for making electrical heating mats of the low temperature type, and in particular to methods for making structures comprising one or more metal strips arranged in a meander like pattern to constitute an electrical resistance element bonded to an insulating carrier film. Such heating mats or structures are well known in the prior art, such as U.S. Pat. Nos. 3,263,307 and 3,336,557 (Both O. G. Lund et al). The drawbacks of the mats described in these patents are that the meander like patterns are obtained not only by cutting a resistance foil into the desired pattern, but the process described also requires removal of foil material cuttings to provide necessary space between the strips. The problem of removing foil material has been overcome by the proposal described in U.S. Pat. Nos. 4,025,893 and 4,092,626 (both H. A. Bergersen), whereby a wide resistance foil is cut continuously into a number of longitudinal parallel strips, whereupon these strips are spread out. In order to obtain the meander pattern from these parallel strips of the desired electrical resistance element, there are at regular intervals arranged transverse metal strips. These transverse strips have to be positioned very accurate relative to the position of the longitudinal resistance strips, and it will be very difficult to obtain good results with this method.

Solutions for obtaining electrical foil heating structures without removing foil cuttings are also described in U.S. Pat. No. 3,020,378 (P. Eisler). In this patent there are basically described two different methods of obtaining meander like patterns in a resistance foil. In accordance with one of the methods described, the foil is cut in a direction transverse to the longitudinal direction of the foil, and the cuts are opened by crimping and indenting the foil or by forcing insulation material into the cuts. The second process described involves longitudinal cutting of the foil as the foil passes over suitable foil moving devices, and includes means for stretching the foil in the transverse direction to open the cuts. The latter process was probably never reduced to practice.

In order to make heating mat out of the meander like resistance elements provided by the above methods, the resistance foil is laminated to one or more insulating carrier films, and the composite longitudinal structure is cut into suitable lengths and provided with bus bars and terminations.

The object of the present invention is to provide a method for making electrical heating elements which are simpler in operation than the above mentioned methods, and which more readily may be adapted to automatic continuous production.

The main features of the invention are defined in the attached claims.

Figure 4:
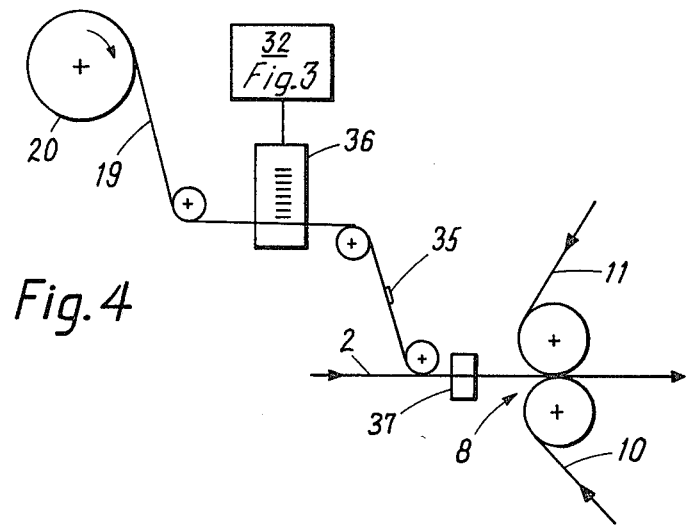
Figure 5:
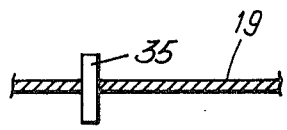

Above mentioned and other objects and features will clearly appear from the following detailed description of embodiments of the invention taken in conjunction with the drawings, where FIG. 1 schematically shows a method for making electrical heating mats in accordance with the present invention, FIG. 2 schematically illustrates the cutting and stretching steps of the method, FIG. 3 schematically shows a method by which the cutting process is controlled by a foil thickness detector and a foil length monitoring device, FIG. 4 shows a method for provision of termination/bus bar assemblies, while FIG. 5 illustrates a termination/bus bar assembly, FIG. 6 illustrates a locking process, while FIG. 7 illustrates apertures in an insulation film, FIGS. 8–11 show four alternative terminations/connections to be provided on the heating elements, FIGS. 12–13 show interconnection of heating mats, FIG. 14 shows transverse cutting lines for a continuous foil, and FIGS. 15–16 show alternative foil cutting means.

From a supply reel 1, FIG. 1, there is provided a composite metal/plastic foil or a laminate 2 consisting of a raw material metal foil 3 laminated to a somewhat wider insulation film 4 as illustrated in FIG. 2, in which the apparatus of FIG. 1 is schematically illustrated and some of the machine parts have been removed for clarification. The lamination process may alternatively be undertaken in a conventional tandem process (not shown) prior to feeding of the laminate to a set of feeding rollers 5 or other foil moving means. In order to produce the desired meander formed resistance strip pattern, the composite foil is now pulled towards a second set of foil moving means 6 while a set of cutting means 7 are arranged to cut the foil as illustrated in FIG. 2. The cutting action can be realized in many different ways, as described in connection with FIGS. 15–16. The insulation film 4 of the composite foil 2 should be of an easily stretchable material like polyethylene or nylon. As mentioned the insulation part 4 of the composite foil is wider than the metal part 3, and the purpose of the next step in accordance with the present invention is to expand the cuts made in the composite foil by a longitudinal stretching process. The composite foil 2 is therefore passed over a third foil moving device 8 which rotates or moves at a longitudinal speed slightly higher than that of the foil moving means 5 and 6. In order to control the stretching process, there is arranged a foil tension monitoring device 9. In a further step the cut and stretched composite foil 2 is laminated to an insulation film 11 and possibly also to a film 10 supplied respectively from supply reels 12 and 13. The resulting laminate 14 is passed through an insulation foil welding device 15, to produce a laminated resistance foil 16 which may be wound onto a reel 17. The foil produced may be continuously measured by a foil length monitoring device 18 capable of controlling functions to be described later.

The stretching process and/or lamination process obtained by the foil moving arrangement 8 may be combined with a bus bar application process, by which one or two longitudinal bus bar tapes 19, which are supplied from a supply reel 20, are bonded to the side areas of the stretchable film 4. The bus bars 19 should preferably be applied to the same side of the stretchable film 4 as the resistance foil 3 in order to facilitate termination of the final product.

In FIG. 2 the foil tension means 9 is shown only partly in order to better illustrate the stretched foil. The degree of stretching is not shown to scale, as it is only necessary to move the metal strips slightly apart to provide a meander formed electrical resistance strip or path. The stretchable film 4 will be stretched at places indicated at 25, whereas the metal foil 3, which is made of a resistance material like lead or a lead/tin alloy or other suitable resistance material, will be stretched only negligibly in the uncut region 26, and the strip material 27 will not tend to buckle.

The width of the resistance strips and to a certain extent also the degree of stretching can be varied in order to produce unit length mats having different resistance and wattage.

In FIG. 3 is schematically illustrated arrangements by which cutting knives 30 and 31 of the cutting means 7 are controlled by a control device 32 giving signals or orders to cut at desired places in order to produce heating mats with desired resistance strip widths.

The resistance foil thickness should be as uniform as possible, and when the thickness is known within certain tolerances there may be produced unit length heating mats with a predetermined wattage simply by adjusting the width of the resistance strip. When the rotational speed of the foil moving devices 5 and 6 is known, the control device 32 may be provided with means for setting the desired resistance or wattage values. The knife 30 will start cutting at a desired place and moment, and it may be arranged to follow the longitudinal movement of the foil while cutting. As soon as the knife 30 has completed its cut, it will be lifted, and the knife will return to its start point in the transverse direction of the foil as well as in the longitudinal direction of the foil. The knife 31 will now wait for its cutting order, upon receipt of which it will complete its cut in a similar way as that described for knife 30. The longitudinal movement of the knives is not illustrated. In the case of full length up-and-down moving cutting knives (not shown) the cutting action may probably be undertaken so rapidly that there is no need for longitudinal knife movement.

While the thickness of the resistance foil is in the order of 5 $\mu m$–25 $\mu m$ it is very difficult to obtain a uniform thickness, say 11 $\mu m \pm 5\%$ over a complete length or roll of foil. This difficulty may, however, be overcome by introducing a foil thickness detection device 33. As illustrated in FIG. 3, signals from the device 33 are fed to the control device 32, in which the cutting order settings are modified so that the cutting device 7 (30 and 31) produces resistance strips having, not equal and predetermined width, but equal and predetermined resistance per unit length. Thereby is ensured that unit length heating mats having predetermined wattage may easily be produced.

The setting of the cutting mechanism 7 (30, 31) may be facilitated by using a foil length monitoring device 18 (FIG. 3, FIG. 1) which for instance may be arranged to send electrical synchronization signals to the control device 32. The device 18 may for instance be arranged to generate and transmit one signal pulse per cm or inch of foil length. An alternative position of the foil length monitoring device 18 may be immediately after the welding device 15, FIG. 1 where the laminated resistance foil 16 is fully stabilized. On basis of a desired mat length the control device 32 is set to cut a desired number of cuts in the composite foil 2 so that termination means can be provided at desired places. Termination can be made by means of tinned copper strips or tapes which are soldered or welded to the resistance strips and bus bars.

The mat termination can be realized in two ways. One way of realizing termination is illustrated in FIG. 4 showing means for providing the bus bars 19 with terminations 35. The bus bars 19 from the supply reel 20 pass a soldering apparatus 36 in which the terminations 35 are soldered, as is also illustrated in FIG. 5, to the bus bars 19 at predetermined places. The electrical interconnection between termination strips 35 and the resistance strip 27 (FIG. 2) may be undertaken in a soldering machine 37 before laminating the composite foil 2 between the insulation films 10 and 11. It will, however, also be possible to complete this soldered interconnection at a later stage, e.g. after the welding machine 15, because the very little heat which is required to obtain a good connection will hardly damage the films 10 and 11. Possible damages of the films 10 and 11 at the soldering place can be easily sealed. Termination strips 48 FIG. 11 would, if required, have to be provided in the soldering machine 37.

Another way of realizing termination is by providing apertures or holes 40, FIG. 7 at predetermined places in the insulation film 11 before it is welded to the cut composite foil 2, so as to leave access to the bus bars 19 and desired portions of the resistance strip 27 and facilitate mounting of the terminations. This is illustrated in FIG. 6 where the insulation film 11 supplied from the reel 13 passes a hole locking machine 41 before it is laminated to the foil 2, bus bar(s) 19 and insulation film 10. The bus bar(s) 19 may or may not be provided with termination strips 35. The termination strip 35 or termination strips 45–47 (FIGS. 8–10) may be provided in a termination soldering machine 42 placed after the welding machine 15 or at some later stage. The terminations 48, FIG. 11 may be provided in the soldering machine 42 or at some later stage. The soldering machine 42 may be controlled from the control device 32, FIG. 3.

In order to ensure that the perforations 40, FIG. 7 in the film 11 provided by the locking machine 41, FIG. 6 in connection with the second termination method, and that the applied terminations 35, FIG. 5 provided by the soldering machine 36, FIG. 4 in accordance with the first method, occur at the correct places in order to fit with the desired mat length and also with the correct places of the resistance strip 27, the locking machine 41 and the soldering machine 36, FIG. 4 may be controlled from the control device 32, FIG. 3.

In FIGS. 8–10 are respectively illustrated termination means 45–47 by which the resistance foil 16 is provided with external connection 45 to bus bar 19 and resistance strip 27, FIG. 8,–internal connection 46 between bus bar 19 and resistance strip 27, FIG. 9, and external connection with the bus bar 19 only, FIG. 10. All these connections may be provided with the programmed soldering machine 36, FIG. 4.

In FIG. 11 is illustrated an external connection 48 with the resistance strip 27. Such connection to a foil side area not provided with a bus bar, may be obtained through apertures 40, FIG. 7, by soldering the connection piece 48 to the strip 27.

For making heating mats out of the laminated resistance foil 16, this foil must be cut transversely into mats of suitable length. In FIG. 12 there are shown two heating mats 50 each provided with two terminations 45. The bus bars 19 have only a foil stabilizing function and in principle the mats could be without bus bars if they were provided with terminations 48, FIG. 11. Several mats may then easily be connected in parallel as illustrated, and the terminations 45 can be connected to mains or to other suitable power supply.

In FIG. 13 is schematically illustrated alternative heating mats 55 which may be connected in series. As shown, each mat 55 is provided with one bus bar 19 only, and there are three types of connections, 46 providing internal connection between the bus bar 19 and the resistance strip 27, 47 providing external connection from the bus bar 19, and 48 providing external connection from the resistance foil 27. The connections 48 may preferably be provided in a process subsequent to provision of predetermined apertures 40, FIG. 7 in the insulation film 10 before it is welded to the composite foil 2.

In FIG. 14 is schematically illustrated how the continuous resistance foil 16 may be provided with termination 45. While the distance between successive terminations 45 connected to the upper bus bar 19 substantially corresponds to the desired mat length, so does the distance between successive terminations connected to the lower bus bar. When cutting the continuous resistance foil 16 into individual mats 50, FIG. 12 the foil should be cut as indicated by cutting lines 60, FIG. 14. The number of zig-zags between any two cuttings lines will usually be so high that there is no difficulty in obtaining unit length mats having substantially the same resistance.

An example of a typical mat to be produced in accordance with the present invention is one having the following data:

| | | |
|---|---|---|
| length | 2150 | mm |
| width | 600 | " |
| strip width | 5,4 | " |
| mat thickness | 0,2 | " |
| ohms per mat | 235 | ohms |
| number of zig-zags | 254 | |
| load per mat | 190 | Watts |

Suitable floor, wall and ceiling heating mats can have sizes in the range of 0.5–10 m$^2$, the resistance strip width being in the range of 2–20 mm, giving loads in the range of 50–500 Watts per m$^2$.

Alternatively to the cutting device 7, FIG. 1 there may be arranged a roller 65, FIG. 15, provided with equally distributed longitudinal cutting knives, the knives of the cutting roller moving at a speed corresponding to the longitudinal speed of the composite foil moving from the moving means 5 to the moving means 6. In fact the rollers 5, 6 and the cutting roller 65, could be geared to the same peripherial speed.

An alternative solution for making desirable cuts in the foil may be to use rotating knives 70 as illustrated in FIG. 16. While the profile of the knives may be varied and the longitudinal knife edge may be designed to part from a generatrix line for instance by making it follow a slightly screw shaped line, the best mode of cutting will be performed with cutting devices by which the strip width may be varied more readily than by changing tools.

The cutting devices should preferably, as described in connection with FIGS. 1–3, be constituted by two knives cutting alternatively from one side and from the other side. In that way each of the knives has a fixed range along which it will cut, in order to leave a defined uncut region at alternative sides of the foil. Other ways of arranging such cutting devices may be to use up-and-down moving knives having edges corresponding to the desired cut length. Hinged knives working like a pair of scissors may also be designed for this purpose. Finally there may be used non-mechanical cutting devices like heated wires or lasers.

It should be noted that the above detailed description of embodiments of the present invention should not be considered as a limitation on the scope of protection.

I claim:

1. In an improved method for manufacturing an electrical heating foil or mat structure comprising a metal strip arranged in a meander like pattern to constitute an electrical resistance element (27) bonded to at least one insulating carrier film (10, 11) and comprising the steps of making cuts in a raw material metal foil (3) and expanding the cuts to form the meander like pattern before undertaking the bonding process, and where the cuts, which are made in a substantially transverse direction relating to the longitudinal direction of the raw material metal foil (3), are expanded by passing the transversally cut metal foil through two sets of longitudinal foil moving devices (6, 8), the latter moving at a higher speed than the former, so as to stretch the foil in a controlled manner, wherein in the foil stretching process effected by the foil moving devices, the improvement comprises the step of;

bonding the raw material metal foil (3) to a stretchable insulation film (4) which is wider than the metal foil (3), prior to passing of the composite metal/insulation foil (2) to the first one of the two foil moving devices (6), so that in the composite foil (2) the insulation film (4) is extended on both sides of the metal foil (3), which extended side areas are left uncut during the process in which the metal foil (3) and the film (4) are cut so as to only stretch these side areas during the cut expanding process.

2. Method according to claim 1, wherein the stretching process, in particular the extent and uniformness of stretching, is supervised by a foil tension monitoring device (9).

3. Method according to claim 1, wherein the stretching process is combined with a bus bar application process by which at least one longitudinal bus bar tape (19) is applied and bonded to the uncut side area of the stretchable film (2, 4) outside the metal foil meander like pattern, at the place and time at which the desired stretch is reached, so as to facilitate termination and aid in stabilizing the stretched composite foil.

4. Method according to claim 1, wherein the transverse cutting of the foil prior to the stretching process is controlled by a raw material metal foil thickness detecting device (33) so as to facilitate provision of unit length heating mats having a predetermined resistance while maintaining the degree of stretching constant, or taking the stretching factor into consideration.

5. Method according to claim 3, wherein the bus bar application process includes steps of providing termination means (35, 45–48) at predetermined places controlled by a foil length monitoring device (18).

6. The method according to claim 1 wherein the cuts are made in a zig-zag pattern.

* * * * *

UNITED STATES PATENT AND TRADEMARK OFFICE
CERTIFICATE OF CORRECTION

PATENT NO. : 4,354,886
DATED : October 19, 1982
INVENTOR(S) : Hans A. Bergersen

It is certified that error appears in the above-identified patent and that said Letters Patent are hereby corrected as shown below:

On the title page, left-hand column, insert between items [22] and [51]:

--[30] Foreign Application Priority Data
March 25, 1980. . . [NO] Norway. . . 800849--.

Signed and Sealed this

Twelfth Day of July 1983

[SEAL]

Attest:

Attesting Officer

GERALD J. MOSSINGHOFF

Commissioner of Patents and Trademarks